United States Patent
Goguen et al.

(10) Patent No.: US 7,343,423 B2
(45) Date of Patent: Mar. 11, 2008

(54) ENHANCED SWITCHOVER FOR MPLS FAST REROUTE

(75) Inventors: Robert Goguen, Acton, MA (US); Alton Lo, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 10/679,981

(22) Filed: Oct. 7, 2003

(65) Prior Publication Data

US 2005/0097219 A1     May 5, 2005

(51) Int. Cl.
  G06F 15/173    (2006.01)
  H04L 12/28     (2006.01)
  H04L 12/56     (2006.01)

(52) U.S. Cl. .............. 709/239; 370/392; 370/293; 709/242

(58) Field of Classification Search ........... 709/239, 709/242; 370/392–393
See application file for complete search history.

(56) References Cited

U.S. PATENT DOCUMENTS

| | | | |
|---|---|---|---|
| 6,813,242 B1 * | 11/2004 | Haskin et al. | 370/229 |
| 6,895,441 B1 * | 5/2005 | Shabtay et al. | 709/238 |
| 6,904,018 B2 * | 6/2005 | Lee et al. | 370/238 |
| 6,928,050 B2 * | 8/2005 | Lynch et al. | 370/224 |
| 7,058,845 B2 * | 6/2006 | Fujita | 714/4 |
| 2002/0003797 A1 * | 1/2002 | Rautenberg | 370/389 |
| 2002/0060985 A1 * | 5/2002 | Lee et al. | 370/216 |
| 2002/0112072 A1 * | 8/2002 | Jain | 709/239 |
| 2002/0116669 A1 * | 8/2002 | Jain | 714/43 |
| 2002/0133756 A1 * | 9/2002 | Jain | 714/43 |
| 2003/0002444 A1 * | 1/2003 | Shin et al. | 370/238 |
| 2003/0016664 A1 * | 1/2003 | MeLampy et al. | 370/389 |
| 2003/0108029 A1 * | 6/2003 | Behzadi | 370/351 |
| 2003/0110287 A1 * | 6/2003 | Mattson | 709/238 |
| 2003/0210705 A1 * | 11/2003 | Seddigh et al. | 370/419 |
| 2003/0229807 A1 * | 12/2003 | Qiao et al. | 713/200 |
| 2004/0109687 A1 * | 6/2004 | Park et al. | 398/57 |

(Continued)

OTHER PUBLICATIONS

Vasseur, Jean Philippe et al. "Definition of an RRO node-id subobject", IETF Internet Draft, draft-ietf-mpls-nodeid-subobject-00.txt, Feb. 2003, 7 pages.*

(Continued)

Primary Examiner—George C. Neurauter, Jr.
(74) Attorney, Agent, or Firm—Cindy Kaplan (57) ABSTRACT

A Fast Reroute implementation where switchover time to backup tunnels upon failure of a protected network element is independent of a number of entries corresponding to forwarding equivalence classes forwarding over LSPs using that element. During normal operation of a packet forwarding device, adjacency information for a received packet is retrieved from a forwarding table based on a look-up of the packet's forwarding equivalence class. Upon failure of a link or node, the appropriate entries in this forwarding table are rewritten to implement the switchover to preconfigured backup tunnels. The switchover is effective even before the rewrite process has completed. Upon detection of the failure, forwarding processing shifts to a fix-up mode. During the fix-up mode, the look-up to the previously mentioned forwarding table is followed by a look-up to a backup tunnel adjacency table based on a pointer retrieved from the forwarding table. Operations relating to use of this backup tunnel adjacency table increase forwarding time somewhat but only during the special fix-up mode.

17 Claims, 5 Drawing Sheets

U.S. PATENT DOCUMENTS

2004/0114595 A1* 6/2004 Doukai .................. 370/389
2005/0073958 A1* 4/2005 Atlas et al. .............. 370/238
2005/0088965 A1* 4/2005 Atlas et al. .............. 370/216
2005/0188100 A1* 8/2005 Le Roux et al. .......... 709/238

OTHER PUBLICATIONS

Haskin, Dimitry et al. "A Method for Setting an Alternative Label Switched Paths to Handle Fast Reroute", IETF Internet Draft, drafi-haskin-mpls-fast-reroute-05.txt, Nov. 2000, 10 pages.*

Gan, Der-Hwa et al. "A Method for MPLS LSP Fast-Reroute Using RSVP Detours", IETF Internet Draft, draft-gan-fast-reroute-00.txt, Apr. 10, 2001, 12 pages.*

E. Rosen, et al., "Multiprotocol Label Switching Architecture," RFC 3031, Internet Engineering Task Force, Jan. 2001.

Braden, et al. "Resource ReSerVation Protocol (RSVP)-Version 1 Functional Specification," RFC 2205, Internet Engineering Task Force, Sep. 1997.

Awduche, et al., "Requirements for Traffic Engineering Over MPLS," RFC 2702, Internet Engineering Task Force, Sep. 1999.

Ashwood-Smith, et al., "Generalized MPLS Signaling—RSVP-TE Extensions," Internet Draft, Internet Engineering Task Force, Oct. 2001.

Pan, et al., "Fast Reroute Techniques in RSVP-TE," Internet Draft, Internet Engineering Task Force, Oct. 2001.

* cited by examiner

ENHANCED SWITCHOVER FOR MPLS FAST REROUTE

BACKGROUND OF THE INVENTION

The present invention relates to data networking and more particularly to systems and methods for rerouting around failed links and/or nodes.

The Internet and IP networks in general have become enablers for a broad range of business, government, and personal activities. More and more, the Internet is being relied upon as a general information appliance, business communication tool, entertainment source, and as a substitute for traditional telephone networks and broadcast media. As the Internet expands its role, users become more and more dependent on uninterrupted access.

To assure rapid recovery in the event of failure of a network link or node, so-called "Fast Reroute" techniques have been developed. In a network employing Fast Reroute, traffic flowing through a failed link or node is rerouted through one or more preconfigured backup tunnels. The preconfigured backup tunnels facilitate a key goal of Fast Reroute techniques, the redirection of interrupted traffic within tens of milliseconds. This minimizes impact on the user experience.

The Fast Reroute techniques have been developed in the context of MPLS (Multiprotocol Label Switching) where traffic flows through label switched paths (LSPs). When an element such as a link or node fails, all of the LSPs using that failed element are redirected through preconfigured backup tunnels that route around the impacted segments of the LSPs. These backup tunnels are generally used only for a very short time since simultaneously with the rerouting through the backup tunnels, the head ends of all the affected primary LSPs are notified of the failure. This causes the head ends to reroute the primary LSPs around the failures so that the backup tunnels are no longer needed.

A key aspect of meeting the reliability and quality of service objectives of Fast Reroute is the switchover time from the failed segments of the protected primary LSPs to their preconfigured backup tunnels. A certain amount of time transpires while the failure is detected and the actual switchover occurs. In a modern high-speed packet forwarding device, the disposition of a received packet is determined by the contents of a compact forwarding table stored in high speed memory. The forwarding table's entries include so-called "adjacency" information that is used to encapsulate the packet for its transit to the next-hop node in addition to one or more labels that are imposed on the packet to implement the MPLS scheme. Each forwarding equivalence class forwarding over a primary LSP will have an entry in such a table. For optimal performance, only a single look-up is required to access the contents of this table and this look-up is based on the forwarding equivalence class (incoming label or longest match destination address prefix). When an LSP's traffic is to be rerouted into a backup tunnel, the switchover is accomplished by rewriting all of the appropriate entries.

A problem arises, however, in that a single failed link or node may carry a large number of protected LSPs and therefore a large number of entries corresponding to the forwarding equivalence classes forwarding over those protected LSPs. A switchover may therefore require rewriting a large number of entries. If, for example, one thousand entries must be rewritten in response to the failure of a single link and each entry rewrite requires 150 microseconds, the switchover process will consume 150 milliseconds during which service will be interrupted. This level of delay is unacceptable.

What is needed are readily scaleable systems and methods for accelerating the switchover to preconfigured backup tunnels upon failure of a protected link or node, while at the same time not slowing down the normal forwarding process.

SUMMARY OF THE INVENTION

Embodiments of the present invention provide a Fast Reroute implementation where switchover time to backup tunnels upon failure of a protected network element is independent of a number of entries corresponding to forwarding equivalence classes forwarding over LSPs using that element. During normal operation of a packet forwarding device, adjacency information for a received packet is retrieved from a forwarding table based on a look-up of the packet's forwarding equivalence class. This adjacency information is used to encapsulate and forward the packet to a next-hop node on the LSP. Upon failure of a link or node, the appropriate entries in this forwarding table are rewritten to implement the switchover to preconfigured backup tunnels.

According the present invention, however, the switchover is effective even before the rewrite process has completed. Upon detection of the failure, forwarding processing shifts to a fix-up mode. During the fix-up mode, the look-up to the previously mentioned forwarding table is followed by a look-up to a backup tunnel adjacency table based on a pointer retrieved from the forwarding table. The backup tunnel adjacency table includes adjacency information to send the packet through a pre-configured backup tunnel. Operations relating to use of this backup tunnel adjacency table increase forwarding time somewhat but only during the special fix-up mode. Once each entry is rewritten, the fix-up mode operation can be skipped for that entry. If there are no pending rewrites, fix-up mode operation can be skipped entirely.

A first aspect of the present invention provides a method for operating a forwarding device. The method includes: receiving a packet to be forwarded, identifying a first forwarding table entry corresponding to a forwarding equivalence class of the packet, if a forwarding interface identified by the first forwarding table entry is protected by an active backup tunnel and adjacency information for the active backup tunnel has not yet been included in the entry, performing a look-up in a second forwarding table to retrieve the adjacency information for the active backup tunnel, and forwarding the packet in accordance with the adjacency information retrieved from the second forwarding table.

A second aspect of the present invention provides a method of operating a forwarding device. The method includes: providing a forwarding table with entries corresponding to primary tunnels. Each of the entries includes: adjacency information for packets matching the entry, a backup tunnel table identifier pointing to adjacency information for a backup tunnel assigned to the entry, and a pointer to a backup tunnel active flag for a backup tunnel protecting the corresponding primary tunnel. The method further includes: providing a backup tunnel active table holding the backup tunnel active flags pointed to by the forwarding table entries, and providing a backup tunnel adjacency table with entries indexed by backup tunnel table identifier. Each of the entries includes adjacency information for packets taking a backup tunnel referenced by the entry's backup tunnel identifier.

A third aspect of the present invention provides a method of operating a forwarding device. The method includes: storing adjacency information for a primary tunnel in a first forwarding table, establishing a backup tunnel protecting a segment of the primary tunnel, storing adjacency information for the backup tunnel in a second forwarding table, when the primary tunnel is operative, forwarding packets assigned to the primary tunnel based on a single look-up to the first forwarding table, and upon activation of the backup tunnel in response to failure of the primary tunnel segment, forwarding packets assigned to the primary tunnel via the backup tunnel based on a look-up in the first forwarding table followed by a look-up in the second forwarding table.

Further understanding of the nature and advantages of the inventions herein may be realized by reference to the remaining portions of the specification and the attached drawings.

DESCRIPTION OF SPECIFIC EMBODIMENTS

The present invention will be described with reference to an exemplary label switched router (LSR) in a representative network. The LSR may be e.g., an edge router or interior router of an MPLS network. The present invention, however, can be applied to a wide variety of network devices and network configurations.

At the ingress to a label-switched network, one or more labels are assigned to each incoming packet before forwarding the packet to the next-hop node. At each intermediate node, a forwarding selection and a new substitute label are determined by based on the label found in the received packet. At the network egress (or one hop prior), a forwarding decision is made based on the incoming label but no label is included when the packet is sent on to the next hop. Label switched paths (LSPs) are tunnels through the network constructed by the control plane by distributing labels and other information used to make forwarding decisions among the network nodes.

Figure 1:
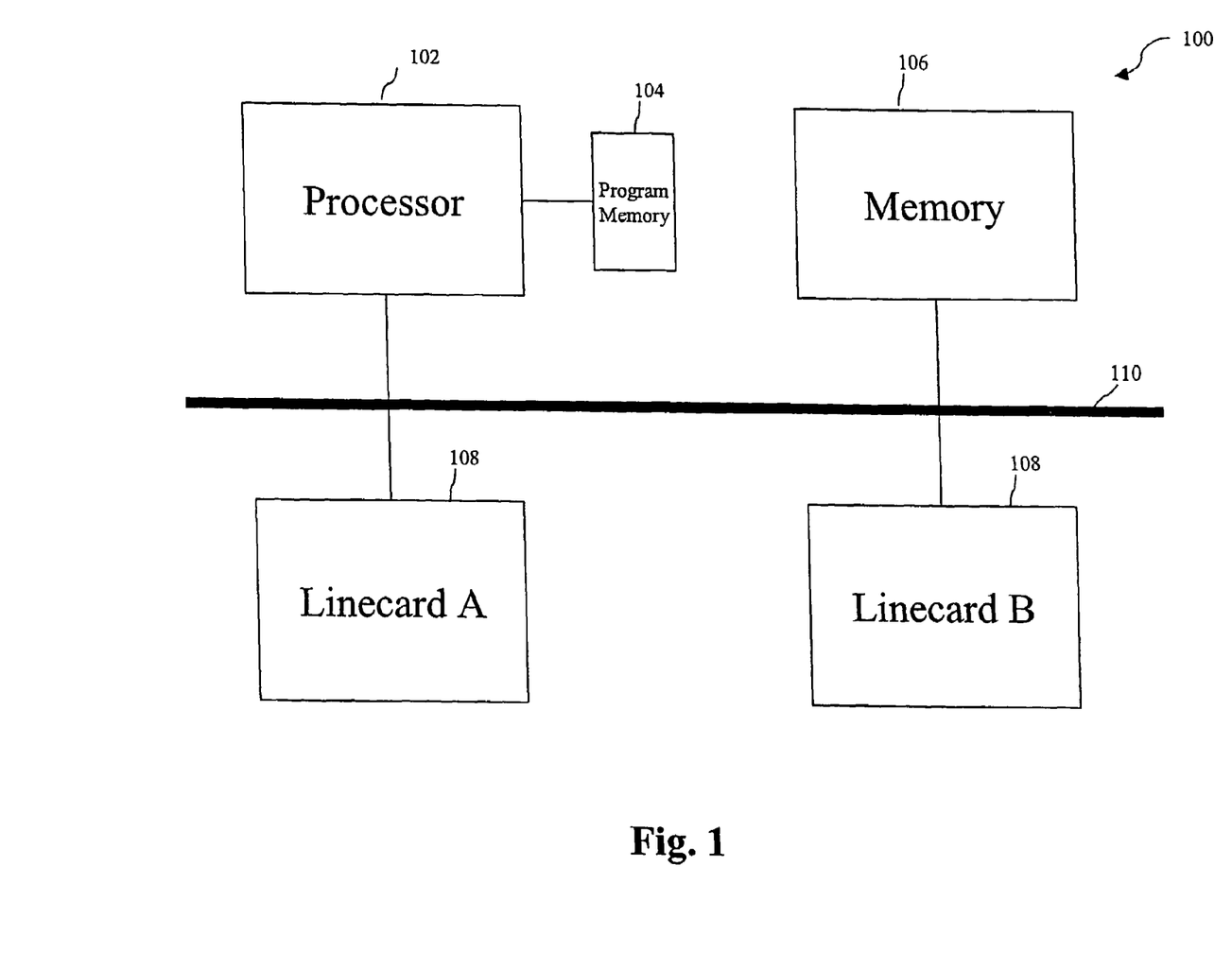
FIG. 1 depicts a network device according to one embodiment of the present invention.

FIG. 1 depicts a network device 100 that may be used to implement embodiments of the present invention. Network device 100 includes a central processor 102 that executes codes stored in a program memory 104. Program memory 104 is one example of a computer-readable medium. Program memory 104 can be, e.g., a volatile memory. Another form of computer-readable medium storing the same codes would be some type of non-volatile storage such as floppy disks, CD-ROMS, DVD-ROMS, hard disks, flash memory, etc. A carrier wave that carries the code across the network is an example of a transmission medium. A packet memory 106 is also provided for intermediate storage of packets. Network device 100 interfaces with physical media via a plurality of linecards 108. Although only two linecards 108 are shown it is understood that there may be numerous linecards within network device 100. It will also be appreciated that each linecard 108 may include numerous separate physical interfaces. For example, a particular linecard may include a large number of electrical and/optical interfaces. Such interfaces include, but are not limited to Ethernet interfaces, Gigibit Ethernet interfaces, DS-1, DS-3, Frame relay interfaces, ATM interfaces, SONET interfaces, dial-up interfaces, DSL interfaces, wireless interfaces, etc. The various components are interconnected by a backplane 110.

Figure 2:
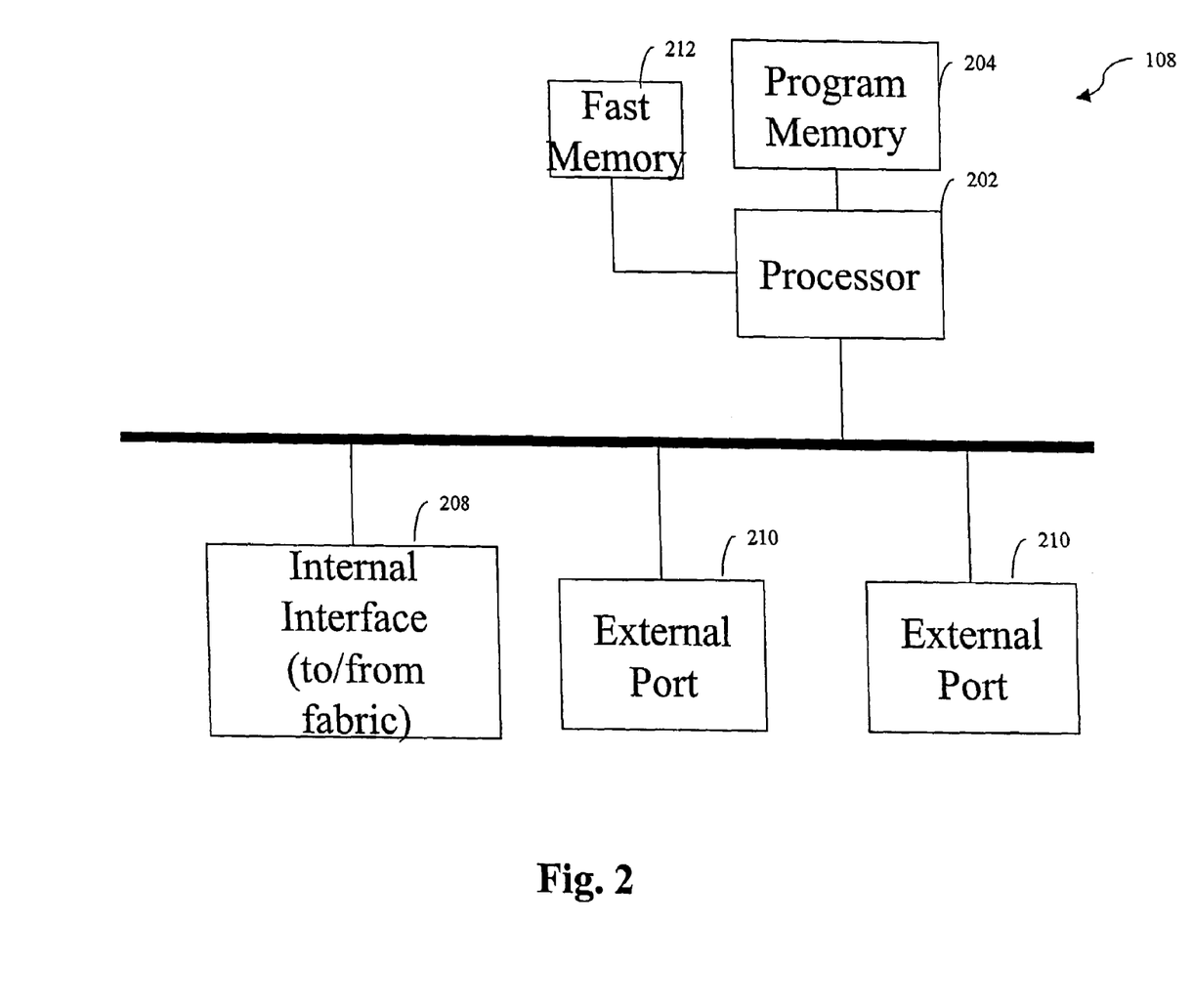
FIG. 2 depicts a linecard according to one embodiment of the present invention.

FIG. 2 depicts structure of one of the linecards 108 according to one embodiment of the present invention. Representative linecard 108 includes a processor 202 to perform operations specified by aspects of the present invention. Like processor 102, processor 110 may execute instructions stored in a program memory 204. Program memory 204 may represent any of the computer-readable medium types described in reference to memory 104 and instructions for processor 202 may be stored on any type of volatile or fixed computer-readable medium as referred to above. A packet memory 206 provides intermediate storage of packets internally within linecard 108. Linecard 108 includes an internal interface 208 to backplane 110 of network device 100 and also includes external ports 210 to provide connectivity outside network device 100. The precise structure of external ports 210 will of course depend on the particular type of network, transmission medium, etc., to which they are connected.

Processor 202 also has access to a fast memory 212. Fast memory 212 may be used for high speed look-ups of forwarding information. Fast memory 208 may be, e.g., a SRAM, a content-addressable memory, etc., or some combination thereof.

Network device 100 operates in accordance with various protocols including, e.g., TCP/IP, MPLS, MPLS Traffic Engineering, MPLS Fast Reroute, etc. The following documents (and other documents referenced by these documents) define protocols that may be practiced by network device 100.

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling —RSVP-TE Extensions," Internet Draft, Internet Engineering Task Force, October 2001.

Pan, et al., "Fast Reroute Techniques in RSVP-TE," Internet Draft, Internet Engineering Task Force, October 2001.

The contents of the above documents are herein incorporated by reference in their entirety for all purposes.

In one embodiment, routing functionality is divided among the various linecards 108 and processor 102. Processor 102 operates as a Routing Processor (RP). Routing processor 102 is responsible for control plane functionality. Forwarding of packets is handled by linecards 108.

In one implementation, when a packet is received by a particular linecard 108 that linecard determines the output linecard and interface and forwards the packet there. Prior to transfer of the packet, the receiving linecard encapsulates the packet with any needed layer 2 addressing information for forwarding to the next hop node and the label or labels required by operation of the MPLS and/or MPLS Fast Reroute protocols. The term "adjacency information," as used herein refers generally to information such as the layer 2 source and destination addresses, the linecard and interface to be used for forwarding, policy information for a given LSP, etc. "Forwarding information" includes adjacency information and the labels to be imposed on the packets traveling via the LSP.

Look-up and attachment of layer 2 address information and a label (or labels) to the packet may be divided between the ingress linecard and egress linecard in a number of ways. However, in the discussion herein, all of the needed information for forwarding packets is stored on the ingress card. Layer 2 encapsulation and imposition of any needed labels also occur in the ingress card in the discussion herein. The routing processor (processor 202) sets up label switched paths (LSPs) and backup tunnels by appropriately modifying forwarding information on the linecards 108. The primary LSPs may support, e.g., Traffic Engineering tunnels, layer 2 or layer 3 virtual private networks, pseudowire emulated circuits, virtual private LAN service, etc.

If network device 100 is an edge ingress router to the MPLS network, then the look-up of forwarding information will be based on the destination IP address prefix of the packet since the packets arrive without an MPLS label. For such packets, the forwarding equivalence class is specified by a variable length address prefix and a mask that specifies the length of the prefix within the address. There is a match between the destination address and a forwarding equivalence class if the destination address value and prefix value are a bit-wise identical for the length of the prefix specified by the mask. The forwarding equivalence class of the packet is the one specified by the longest prefix that matches the packet's destination address. If, on the other hand, network device 100 is an interior LSR of the MPLS network, the look-up of forwarding information is based on a label of the received packet. The label specifies the forwarding equivalence class.

In the prior art, switchover to a backup tunnel is implemented by rewriting appropriate entries in the forwarding tables of the linecards. A single link or node failure, however, may require numerous such entries to be rewritten. The rewrite process itself thus becomes a limiting factor to achieving desired switchover times. According to embodiments of the present invention, switchover is accelerated by using a two-stage look-up process, but unlike in certain prior art implementations, the two-stage look-up process is employed only while the forwarding table is rewritten. In this way, a large number of LSPs may be accommodated on the same protected link or node without any increase of switchover time. Also, unlike prior art schemes that always perform a two-stage look-up to accommodate the possibility of active backup tunnels, embodiments of the present invention compromise packet handling performance only during the brief intervals required to rewrite forwarding tables.

Figure 3:
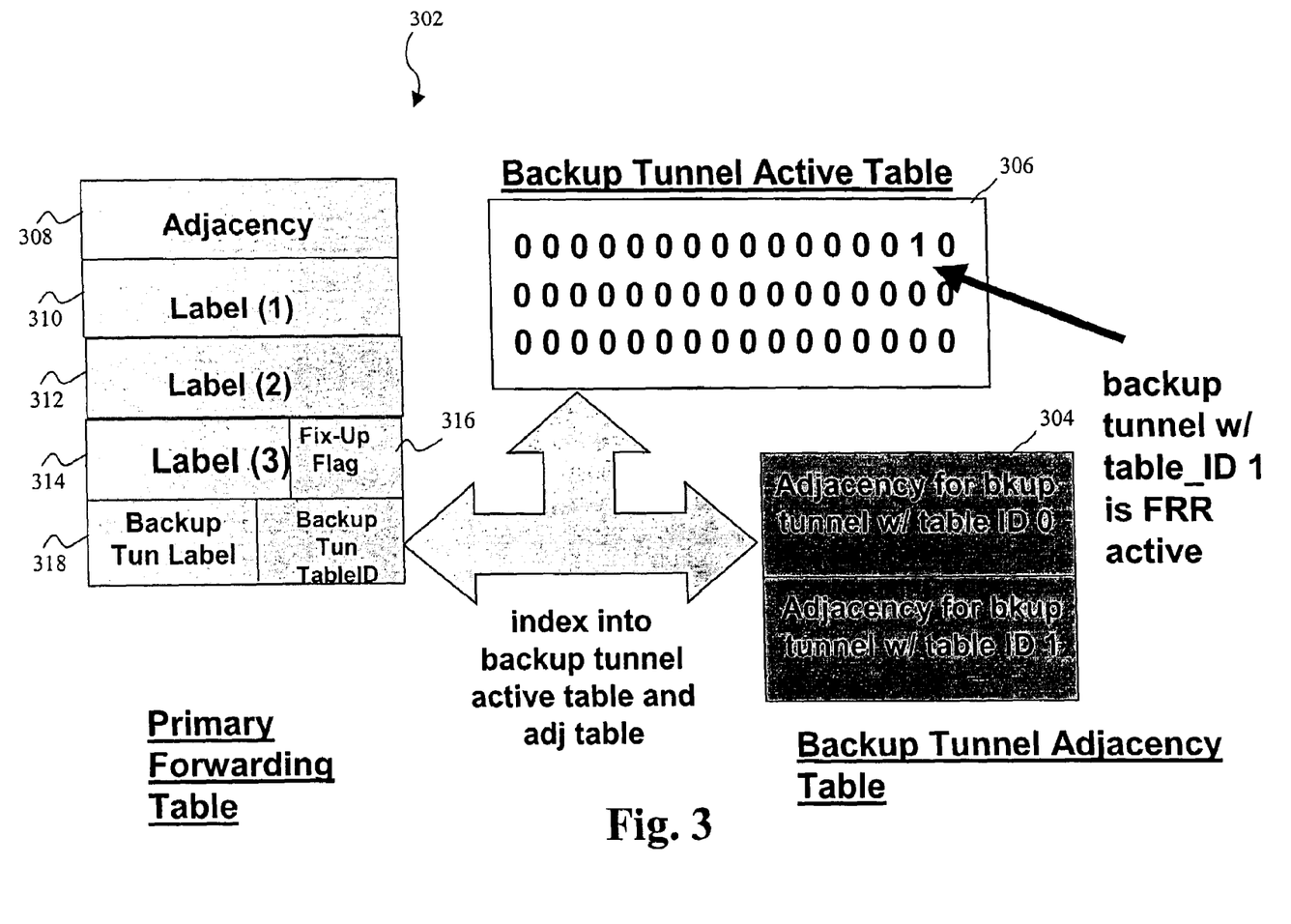
FIG. 3 depicts data structures used in forwarding packets according to one embodiment of the present invention.

FIG. 3 depicts data structures useful in implementing a forwarding scheme according to embodiments of the present invention. There are three tables. A primary forwarding table 302 is the sole source of forwarding information in a normal mode. In a special fix-up mode provided by embodiments of the present invention, adjacency information may be retrieved instead from a backup tunnel adjacency table 304. Backup tunnel adjacency table 304 is indexed by an identifier referred to herein as the backup tunnel table identifier. The backup tunnel table identifier uniquely identifies a combination of backup tunnel and the interface connected to the link or node protected by the backup tunnel. Note that the same backup tunnel can protect both a link and a node to which the link connects. If this is the case then only one backup tunnel table identifier is used because both the link and node are accessible through the same interface. This identifier scheme recognizes that a particular backup tunnel can be used to protect multiple network elements and the forwarding processes described herein requires unique identification of both the backup tunnel and protected element to know whether the second look-up is in fact necessary for a given LSP. Each entry in table 304 includes the adjacency information for a particular backup tunnel table identifier.

A backup tunnel active table 306 includes a flag for each backup tunnel table identifier. This flag indicates whether the identified backup tunnel is actively protecting a link or node accessed via the identified interface. Since backup tunnel active table 306 requires only a single bit per backup tunnel table identifier, holding the state for 2048 backup tunnel table identifiers requires only 64 words of memory. In addition to the three depicted tables, there is also a global fix-up flag to indicate whether the linecard is currently in the fix-up mode, i.e., whether there are any pending rewrites of the adjacency information in primary forwarding table 302.

Table 302 typically includes an entry for each forwarding equivalence class (i.e., received label or longest match destination address prefix). Since a single LSP can carry traffic of many forwarding equivalence classes, there can be many entries for each LSP. Access to table 302 is via a single lookup based on the packet's forwarding equivalence class. Referring now to the details of a particular entry of primary forwarding table 302, several representative fields are shown. A primary tunnel adjacency field 308 includes layer 2 source and destination addresses to be used in encapsulating the packet for forwarding to the next-hop node. There are three label fields 310, 312, and 314 that hold one or more labels to be imposed on packets to be forwarded.

There is a fix-up flag 316 within the third label field 314. The fix-up flag 316 is set if forwarding for the entry's LSP has been switched to the associated backup tunnel but the information in adjacency field 308 has not yet been rewritten to reflect activation of that backup tunnel. The label for the protecting backup tunnel is given in the field 318. This is the label that will be imposed on packets when they are to travel via the backup tunnel instead of any label stored in label fields 310, 312, and 314. A backup tunnel table identifier field 320 holds a pointer to both backup tunnel active table 306 and backup tunnel adjacency table 304.

The various data structures of FIG. 3 are preferably stored in fast memory 212 of each linecard 108. The adjacency information and labels of primary forwarding table 302 are determined by the control plane as LSPs are established and modified. The contents of backup tunnel adjacency table 304 are determined as the control plane preconfigures backup tunnels to protect links and/or nodes. The contents of backup tunnel active table 306 change as backup tunnels are put into operation.

Figure 4:
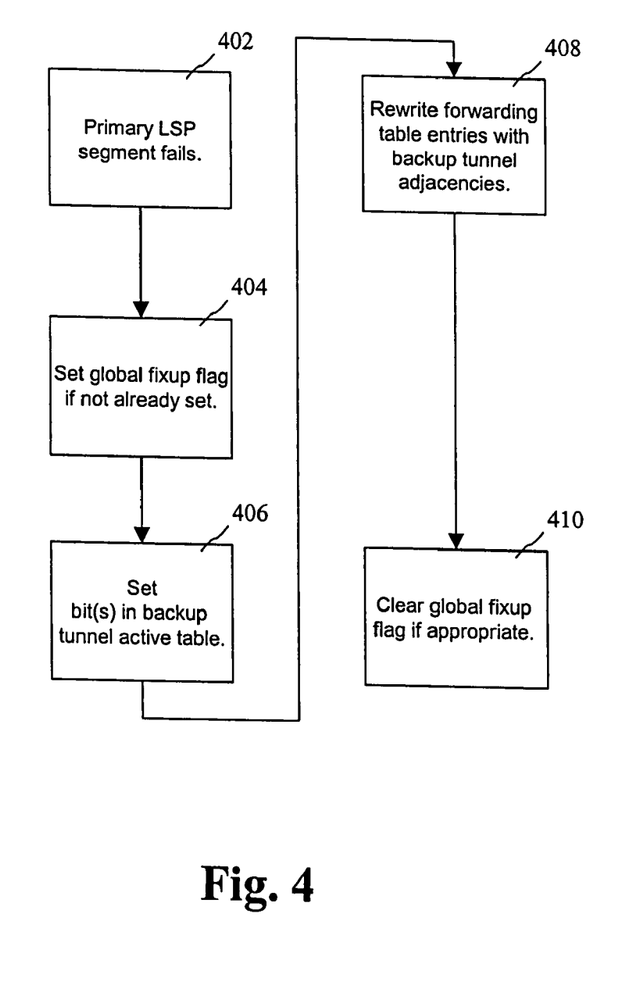
FIG. 4 is a flow chart describing steps of reacting to a failure according to one embodiment of the present invention.

FIG. 4 is a flowchart describing steps of switching over a primary LSP from a failed next segment to a protecting backup tunnel. Linecard 108 reports this failure to routing processor 202. At step 402, one of linecards 108 detects the failure of a link or node to which is it connected. The failure of a particular link or node means that all of the primary LSPs that use that link or node will also fail. Routing processor 202 responds by notifying all of the linecards 108 of the failure. The backup tunnel which has been preconfigured to protect the failed LSP segment should now be invoked. At step 404, each of the linecards 108 sets its global fix-up flag if is not already set to indicate that there is now an active rewrite process for the adjacency information in primary forwarding table 302. The global fix-up flag may already be set due to other Fast Reroute operations.

Then at step 406, appropriate bits are set in backup tunnel active table 306 to reflect each combination of active backup tunnel and interface linked to the protected element. At this point, the switchover to backup tunnel operation has essentially already occurred even though no entries in forwarding table 302 have been rewritten. Execution of steps 402, 404, and 406 may require only approximately 5 milliseconds. At step 408, the adjacency information in forwarding table 302 is rewritten with the backup tunnel adjacency information. All of the entries corresponding to LSPs impacted by the failure will have their entries rewritten. This process occurs in the background in parallel with normal forwarding operations. As each entry is rewritten, the fix-up flag associated with the entry is cleared. This allows fix-up mode operation to be skipped for that entry. When all of the affected entries corresponding to a given backup tunnel table identifier have been rewritten, the corresponding bit in the backup tunnel active table is cleared. Once all of the impacted LSPs have their forwarding table entries rewritten, the global fix-up flag is cleared at step 410. The flag clearing of step 410 occurs only if there are no other pending Fast Reroute rewriting operations pending.

At the completion of Fast Reroute operation for a given LSP, when the LSP is rerouted to avoid the failed element and traffic is taken off the backup tunnel, the corresponding entries in primary forwarding table 302 are modified with revised adjacency information and possibly revised labels to impose. Also, the fix-up flag for the entry is initialized as set. This flag is also initialized as set when a new entry in table 302 is established.

Figure 5:
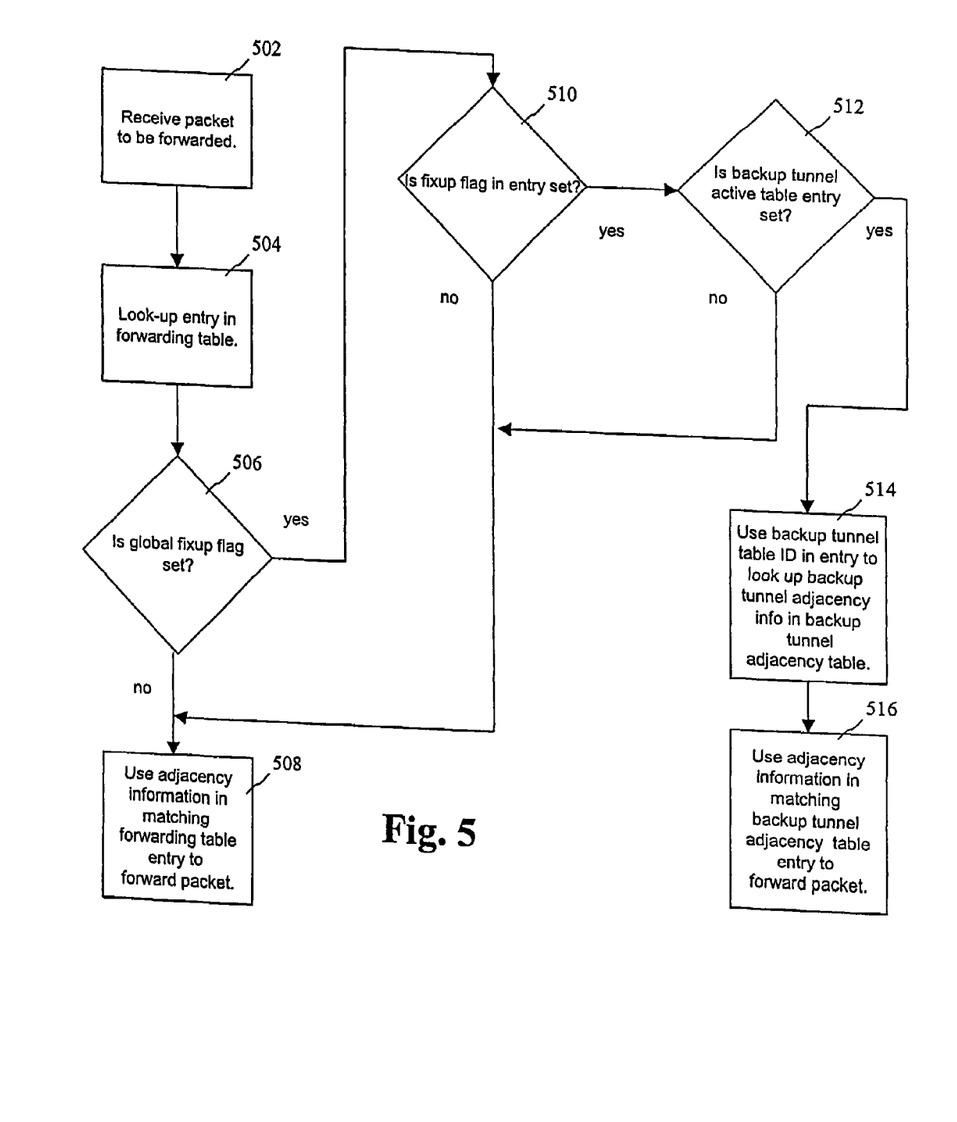
FIG. 5 is a flow chart describing steps of forwarding a packet according to one embodiment of the present invention.

FIG. 5 is a flow chart describing steps of handling a packet to be forwarded according to one embodiment of the present invention. At step 502 a packet to be forwarded is received. At step 504, the appropriate entry is located in primary forwarding table 302 based on the forwarding equivalence class of the packet. If the packet has a previously imposed MPLS label or labels, the "topmost" label is used to identify the appropriate entry in forwarding table 302. If there is no previously imposed label, the longest match technique is used to find the appropriate entry in table 302 based on the packet's destination address. The packet is thus now associated with a particular entry in primary forwarding table 302.

A step 506 tests whether the global fix-up flag is currently set indicating that at least some entries are currently in fix-up mode with Fast Reroute in effect but the entry not yet rewritten. If the global fix-up flag is not set, then processing proceeds to step 508 where the adjacency information and labels found in the selected entry of primary forwarding table 302 are used to encapsulate and forward the packet. In the flow chart of FIG. 5, step 508 may be reached by a number of paths. Reaching step 508 indicates that the relevant LSP is in normal operation or that a backup tunnel is being used to bypass a segment of the LSP but the entry adjacency information has already been rewritten to reflect use of the backup tunnel.

If step 506 finds that the global fix-up flag is set, then at step 510 the fix-up flag located in the primary forwarding table entry is tested. It may be that there are pending rewrites for other entries but this entry has already been rewritten and thus there is no need to refer to backup tunnel adjacency table 304 or backup tunnel active table 306. If the fix-up flag is clear, indicating that this entry has already been rewritten (or that the pending rewrite operations do not even relate to this LSP) then normal forwarding occurs at step 508.

If the fix-up flag for the entry is set, then processing proceeds to a step 512. At step 512, the backup tunnel table identifier for the selected entry is retrieved and used as a pointer to a particular bit in backup tunnel active table 306. If this bit is set then there is an active backup tunnel protecting the entry's LSP. If the bit is clear, Fast Reroute is not active for the LSP and normal forwarding occurs at step 508. If the bit is set, then at step 514, the backup tunnel table identifier of the entry is used as a pointer to backup tunnel adjacency table 304. The adjacency information is then retrieved at step 516 and used to encapsulate the packet for forwarding along with the backup tunnel label and other labels found in the primary forwarding table entry.

It will be appreciated that fix-up mode involves extra look-ups to backup tunnel active table 306 and backup tunnel adjacency table 304 and therefore a slowing in packet forwarding operations. However, this extra look-up occurs only during fix-up mode and only for entries that have not yet been rewritten. Rewrite operations will typically be completed in hundreds of milliseconds so the overall performance impact is minimal. Also, those of skill in the art will appreciate that routers typically operate well below their maximum packet handling capacity further reducing the impact of fix-up mode. The selective use of fix-up mode thus achieves a performance improvement in switchover times that is preserved even as the number of entries using protected LSPs using grows.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a forwarding device, said method comprising:
    receiving a packet to be forwarded;
    identifying a first forwarding table entry corresponding to a forwarding equivalence class of said packet;
    determining whether a forwarding interface identified by said first forwarding table entry is protected by an active backup tunnel and adjacency information for said active backup tunnel has not yet been included in said entry;
    when said forwarding interface is protected by an active backup tunnel and said adjacency information has not been included in said entry,
    performing a look-up in a second forwarding table to retrieve said adjacency information for said active backup tunnel; and
    forwarding said packet in accordance with said adjacency information retrieved from said second forwarding table.

2. The method of claim 1 further comprising:
    if said forwarding interface identified by said first forwarding table entry is either not currently protected by an active backup tunnel or said first forwarding table entry is currently protected by an active backup tunnel and said first forwarding table entry has already been rewritten with adjacency information for said backup tunnel, forwarding said packet in accordance with said adjacency information in said first forwarding table entry.

3. The method of claim 1 further comprising:
wherein determining comprises:
checking a global fix-up mode flag;
if said global fix-up mode is set, checking an entry-specific fix-up mode flag;
if said entry-specific fix-up mode flag is set, extracting a backup table identifier from said first forwarding table entry;
using said backup table identifier to identify a backup tunnel active bit in a backup tunnel active table, said backup tunnel active bit indicating that said forwarding interface identified by said first forwarding table entry is protected by said active backup tunnel.

4. The method of claim 3 further comprising:
upon activation of a selected backup tunnel to handle traffic transmitted via a selected interface, setting a corresponding bit in said backup tunnel active table corresponding to said selected backup tunnel and said selected interface.

5. A method of operating a forwarding device, said method comprising:
providing a forwarding table with entries corresponding to primary tunnels, each of said entries comprising:
adjacency information for packets matching the entry;
a backup tunnel table identifier pointing to adjacency information for a backup tunnel assigned to the entry; and
a pointer to a backup tunnel active flag for a backup tunnel protecting the corresponding primary tunnel;
providing a backup tunnel active table holding the backup tunnel active flags pointed to by the forwarding table entries; and
providing a backup tunnel adjacency table with entries indexed by backup tunnel table identifier, each of said entries comprising adjacency information for packets taking a backup tunnel referenced by the entry's backup tunnel identifier.

6. The method of claim 5 further comprising:
receiving a packet to be forwarded;
forwarding said packet based on information in said forwarding table if an entry in said forwarding table matching said packet is current; and
forwarding said packet based on information in said backup tunnel adjacency table if said matching entry in said forwarding table has not yet been updated to reflect a backup tunnel activation.

7. A method of operating a forwarding device, said method comprising:
storing adjacency information for a primary tunnel in a first forwarding table;
establishing a backup tunnel protecting a segment of said primary tunnel;
storing adjacency information for said backup tunnel in a second forwarding table;
when said primary tunnel is operative, forwarding packets assigned to said primary tunnel based on a single look-up to said first forwarding table; and
upon activation of said backup tunnel in response to failure of said primary tunnel segment, forwarding packets assigned to said primary tunnel via said backup tunnel based on a look-up in said first forwarding table followed by a look-up in said second forwarding table;
wherein said first forwarding table and said second forwarding table are stored at the forwarding device.

8. The method of claim 7 further comprising:
after activation of said backup tunnel, rewriting adjacency information of said primary tunnel in said first forwarding table to reflect use of said backup tunnel; and thereafter
resuming forwarding packets assigned to said primary tunnel based on a single look-up to said first forwarding table.

9. A computer program product for operating a forwarding device, said computer program product comprising:
code that receives a packet to be forwarded;
code that identifies a first forwarding table entry corresponding to a forwarding equivalence class of said packet;
code that determines whether a forwarding interface identified by said first forwarding table entry is protected by an active backup tunnel and adjacency information for said active backup tunnel has not yet been included in said entry, and when said forwarding interface is protected by an active backup tunnel and said adjacency information has not been included in said entry,
performs a look-up in a second forwarding table to retrieve said adjacency information for said active backup tunnel and
forwards said packet in accordance with said adjacency information retrieved from said second forwarding table; and
a computer-readable medium that holds the codes.

10. A computer program product for operating a forwarding device, said computer program product comprising:
code that provides a forwarding table with entries corresponding to primary tunnels, each of said entries comprising:
adjacency information for packets matching the entry;
a backup tunnel table identifier pointing to adjacency information for a backup tunnel assigned to the entry; and
a pointer to a backup tunnel active flag for a backup tunnel protecting the corresponding primary tunnel;
code that provides a backup tunnel active table holding the backup tunnel active flags pointed to by the forwarding table entries;
code that provides a backup tunnel adjacency table with entries indexed by backup tunnel table identifier, each of said entries comprising adjacency information for packets taking a backup tunnel referenced by the entry's backup tunnel identifier; and
a computer-readable medium that holds the codes.

11. A computer program product for operating a forwarding device, said computer program product comprising:
code that stores adjacency information for a primary tunnel in a first forwarding table;
code that establishes a backup tunnel protecting a segment of said primary tunnel;
code that stores adjacency information for said backup tunnel in a second forwarding table;
code that, when said primary tunnel is operative, forwards packets assigned to said primary tunnel based on a single look-up to said first forwarding table;
code that, upon activation of said backup tunnel in response to failure of said primary tunnel segment, forwards packets assigned to said primary tunnel via said backup tunnel based on a look-up in said first forwarding table followed by a look-up in said second forwarding table; and a computer-readable medium that holds the codes;
wherein said first forwarding table and said second forwarding table are stored at the forwarding device.

12. The computer program product of claim 11 further comprising:
code that, after activation of said backup tunnel, rewrites adjacency information of said primary tunnel in said first forwarding table to reflect use of said backup tunnel; and
code that resumes forwarding packets assigned to said primary tunnel based on a single look-up to said first forwarding table.

13. Apparatus for operating a forwarding device, said apparatus comprising:
a processor; and
a memory device that stores instructions to be executed by said processor, said instructions comprising:
code that receives a packet to be forwarded;
code that identifies a first forwarding table entry corresponding to a forwarding equivalence class of said packet;
code that determines whether a forwarding interface identified by said first forwarding table entry is protected by an active backup tunnel and adjacency information for said active backup tunnel has not yet been included in said entry, and when said forwarding interface is protected by an active backup tunnel and said adjacency information has not been included in said entry,
performs a look-up in a second forwarding table to retrieve said adjacency information for said active backup tunnel and
forwards said packet in accordance with said adjacency information retrieved from said second forwarding table.

14. Apparatus for operating a forwarding device, said apparatus comprising:
a processor; and
a memory device that stores instructions to be executed by said processor, said instructions comprising:
code that provides a forwarding table with entries corresponding to primary tunnels, each of said entries comprising:
adjacency information for packets matching the entry;
a backup tunnel table identifier pointing to adjacency information for a backup tunnel assigned to the entry; and
a pointer to a backup tunnel active flag for a backup tunnel protecting the corresponding primary tunnel;
code that provides a backup tunnel active table holding the backup tunnel active flags pointed to by the forwarding table entries; and
code that provides a backup tunnel adjacency table with entries indexed by backup tunnel table identifier, each of said entries comprising adjacency information for packets taking a backup tunnel referenced by the entry's backup tunnel identifier.

15. Apparatus for operating a forwarding device, said apparatus comprising:
a processor; and
a memory device that stores instructions to be executed by said processor, said instructions comprising:
code that stores adjacency information for a primary tunnel in a first forwarding table;
code that establishes a backup tunnel protecting a segment of said primary tunnel;
code that stores adjacency information for said backup tunnel in a second forwarding table;
code that, when said primary tunnel is operative, forwards packets assigned to said primary tunnel based on a single look-up to said first forwarding table; and
code that, upon activation of said backup tunnel in response to failure of said primary tunnel segment, forwards packets assigned to said primary tunnel via said backup tunnel based on a look-up in said first forwarding table followed by a look-up in said second forwarding table;
wherein said first forwarding table and said second forwarding table are stored at the forwarding device.

16. The apparatus of claim 15 wherein said instructions further comprise:
code that, after activation of said backup tunnel, rewrites adjacency information of said primary tunnel in said first forwarding table to reflect use of said backup tunnel; and
code that resumes forwarding packets assigned to said primary tunnel based on a single look-up to said first forwarding table.

17. Apparatus for operating a forwarding device, said apparatus comprising:
means for receiving a packet to be forwarded;
means for identifying a first forwarding table entry corresponding to a forwarding equivalence class of said packet;
means for determining whether a forwarding interface identified by said first forwarding table entry is protected by an active backup tunnel and adjacency information for said active backup tunnel has not yet been included in said entry, and when said forwarding interface is protected by an active backup tunnel and said adjacency information has not been included in said entry,
performing a look-up in a second forwarding table to retrieve said adjacency information for said active backup tunnel and forwarding said packet in accordance with said adjacency information retrieved from said second forwarding table.

* * * * *